United States Patent
Cripe et al.

(10) Patent No.: US 8,493,839 B2
(45) Date of Patent: Jul. 23, 2013

(54) METHOD AND SYSTEM OF TEAMED NETWORK ADAPTERS WITH OFFLOADED CONNECTIONS

(75) Inventors: Daniel N. Cripe, Round Rock, TX (US); Robert R. Teisberg, Georgetown, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2820 days.

(21) Appl. No.: 10/717,730

(22) Filed: Nov. 20, 2003

(65) Prior Publication Data
US 2005/0111483 A1   May 26, 2005

(51) Int. Cl.
*H04J 1/00*   (2006.01)
(52) U.S. Cl.
USPC ............... 370/218; 709/230; 709/245; 714/2
(58) Field of Classification Search
USPC ........... 370/216–228; 714/1–5; 709/223–224, 709/230, 250
See application file for complete search history.

(56) References Cited

U.S. PATENT DOCUMENTS

| 6,151,297 | A  | * | 11/2000 | Congdon et al. | ............... 370/216 |
| 6,314,525 | B1 | * | 11/2001 | Mahalingham et al. | ........... 714/4 |
| 6,381,218 | B1 | * | 4/2002 | McIntyre et al. | ............. 370/245 |
| 6,560,630 | B1 | * | 5/2003 | Vepa et al. | ..................... 718/105 |
| 6,938,092 | B2 | * | 8/2005 | Burns | ........................... 709/230 |
| 7,072,345 | B2 | * | 7/2006 | Siu et al. | .................... 370/395.4 |

OTHER PUBLICATIONS

"hp ProLiant network adapter teaming," Jun. 2003, Hewlett-Packard Company, pp. 1-49.

* cited by examiner

*Primary Examiner* — Pao Sinkantarakorn

(57) ABSTRACT

A method and system that comprises a central processing unit (CPU) and a first and second network adapter that are teamed together is disclosed. The network adapters in the team may be adapted to offload connections to transfer a plurality of packets. A program, executing on the CPU, may reload an offloaded connection established by the first network adapter onto the second network adapter if one of a plurality of packets associated with the offloaded connection was received on the second network adapter.

21 Claims, 3 Drawing Sheets

METHOD AND SYSTEM OF TEAMED NETWORK ADAPTERS WITH OFFLOADED CONNECTIONS

BACKGROUND

Computer systems, for example home computers or high-end computers operated as servers, may utilize Network Interface Cards (NICs) to communicate with devices on a computer network. The network may comprise a plurality of devices, such as switches, routers, and other systems, that are coupled together via a network topology, such as Ethernet and Token Ring.

Some computer systems may utilize multiple NICs to increase network throughput and fault tolerance, with each NIC possibly supporting different network topologies and operational speeds. In situations where network configuration is not stable, it may be difficult to manage computer systems that utilize multiple NICs.

SUMMARY

The problems noted above may be solved in large part by a method and system of teamed network adapters with offloaded connections. One exemplary embodiment may be a system that comprises a central processing unit (CPU) and a first and second network adapter that are teamed together. The network adapters in the team may be adapted to offload connections to transfer a plurality of packets. A program, executing on the CPU, may reload an offloaded connection established by the first network adapter onto the second network adapter if one of a plurality of packets associated with the offloaded connection is received on the second network adapter.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the verb "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. The embodiments disclosed should not be interpreted, or otherwise used, as limiting the scope of the disclosure unless otherwise specified. In addition, one skilled in the art will understand that the following description has broad application, and the discussion of any embodiment is meant only to be exemplary of that embodiment, and not intended to intimate that the scope of the disclosure is limited to that embodiment.

Figure 1:
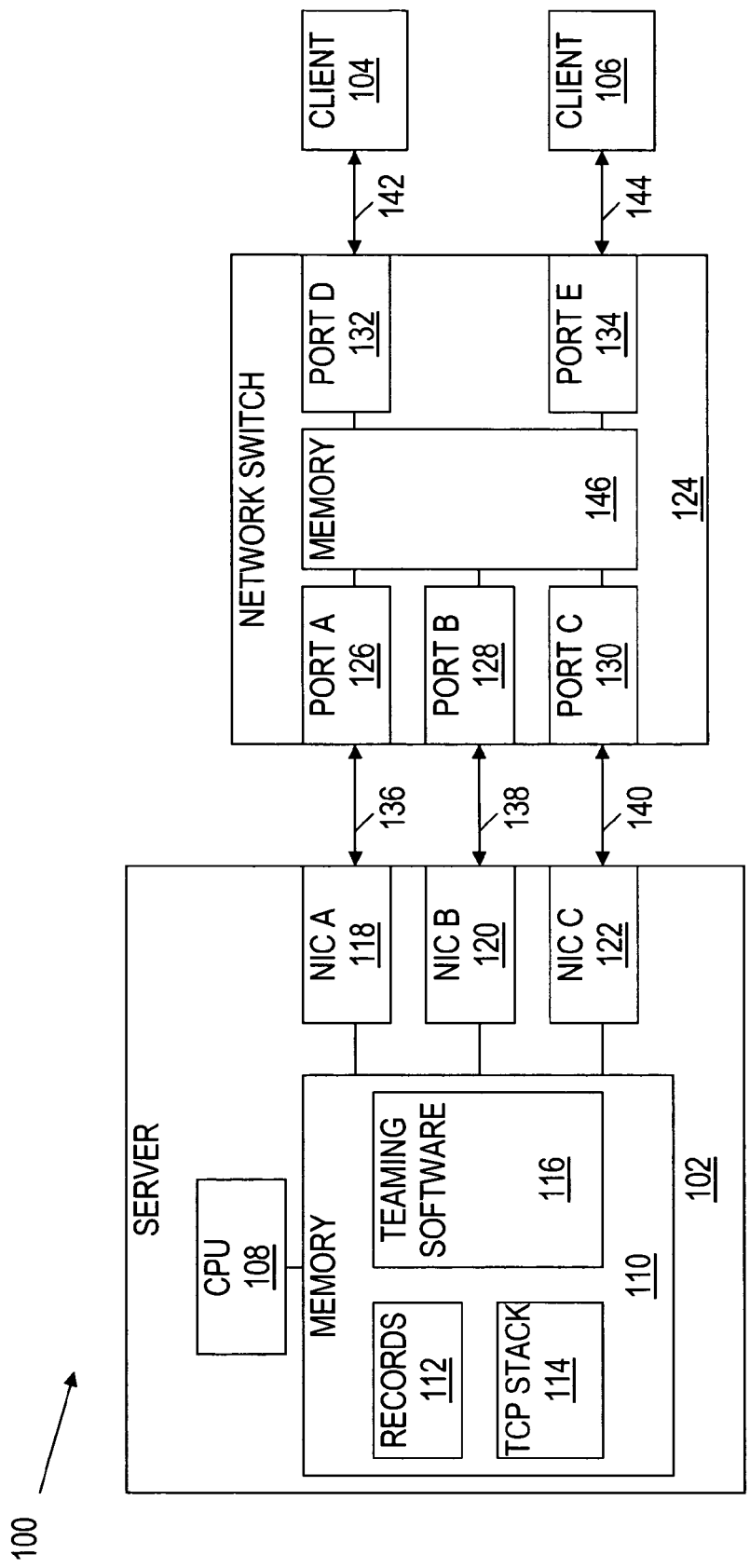
FIG. 1 illustrates a computer network constructed in accordance with embodiments of the invention.

FIG. 1 illustrates an exemplary network constructed in accordance with embodiments of the invention. Network 100 may use any type of network topology, such as Ethernet and Token Ring, that facilitates communications between a server 102 and one or more clients 104 and 106. Further, at least some of the embodiments of the invention were developed in the context of transmission control protocol/internet protocol (TCP/IP) network communications. However, the systems and methods described herein are not limited only to utilizing TCP/IP communications. Many other network protocols may utilize the techniques and systems described herein.

Clients 104 and 106 may be any type of computer system, such as a laptop computer, a personal computer, a stand-alone computer operated as a server, or an embedded computer incorporated into an electronic device. The server 102 may comprise a single CPU 108, as illustrated in FIG. 1, or may comprise a plurality of CPUs arranged in a configuration where parallel computing may take place. The CPU 108 may couple to a memory 110 that may act as a temporary working space for TCP/IP stack 114 software and teaming software 116.

The TCP/IP stack 114 may be software programs and/or drivers for facilitating communications in the network 100, such as TCP/IP communications, through one or more NICs 118, 120, and 122. The NICs 118, 120, and 122 may be any type of network adapter. The teaming software 116 may interact with the TCP/IP stack 114 and group the NICs 118, 120, and 122 into one or more teams, each team functioning as a single "virtual" NIC. Packets sent by NICs 118, 120, and 122 may comprise, among other features, a source media access control (MAC) and IP address (indicating the originating node of the packet), and a destination MAC and IP address (indicating the desired destination of the packet). Each virtual NIC may be assigned a single MAC and IP address. Packets that are sent by the virtual NIC may comprise the assigned MAC and IP address as the source MAC and IP address of the packet, regardless of which NIC actually sends the packet. Packets with the assigned MAC and IP address of the virtual NIC may be received by any NIC in the team.

The NICs 118, 120, 122 may exchange packets of data with the clients 104 and 106 via a network switch 124. The network switch 124 may comprise one or more ports 126-134, and data packets may be transferred between any two ports. The network switch 124 may implement an algorithm to calculate an output port within a group of teamed ports for a given TCP connection. If network topology remains stable, a constant output port is calculated by the algorithm for the given TCP connection. This functionally by the algorithm may reduce the risk that out of order packets arrive at the server 102. The methods and systems described herein expect a constant output port for a given TCP connection when the network topology remains stable. In the exemplary system illustrated in FIG. 1, ports 126, 128, and 130 may couple NICs 118, 120, and 122 to the network switch 124 via links 136, 138, and 140, respectively. Ports 132 and 134 may couple clients 104 and 106 to the network switch 124 via links 142 and 144, respectively. Although not specifically shown, the clients 104 and 106 may each comprise a NIC or other connectivity means for transferring data through the links 142 and 144.

The network switch 124 may receive packets of data from the server 102 and the clients 104 and 106 through switch ports 126-134. The packets may be temporarily stored into a memory 146 contained in the network switch 124 before being transmitted. The memory 146 may be any type of memory capable of storing packets of data, such as random access memory (RAM) and read only memory (ROM). In addition to storing packets, the memory 146 may comprise a routing table (not specifically shown) that indicates which port 126-134 to transmit packets of data that are received by the network switch 124.

Figure 2:
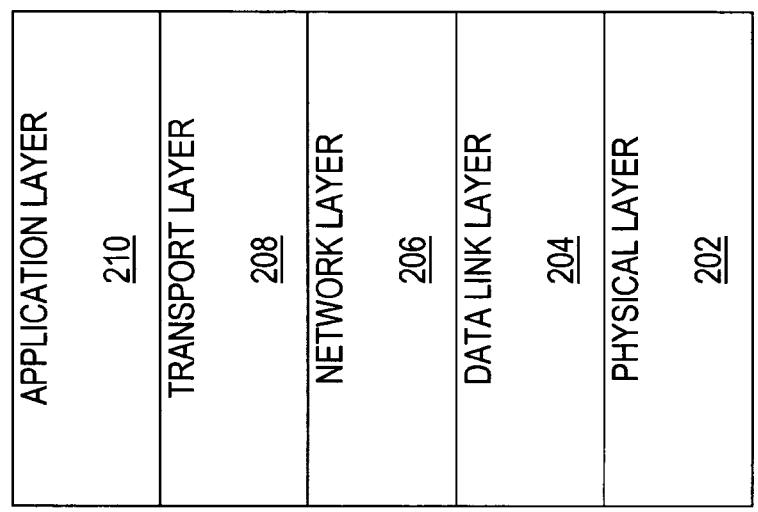
FIG. 2 illustrates the TCP/IP stack of FIG. 1 in accordance with embodiments of the invention.

FIG. 2 illustrates, in block diagram form, the various protocol layers implemented by the TCP/IP stack 114 (FIG. 1). Each layer 202-210 may represent a set of functions and protocols that facilities TCP/IP communications in the exemplary network 100. The physical layer 202 may define the physical characteristics of the network communications. The physical characteristics may include the medium, such as wires, fiber optic links or radio links, and the operable signal strengths, voltages, and error rate for the links 136, 138, and 140. The physical characteristics may be stored in the form of one more data files (not specifically shown) in the memory 110.

The data link layer 204 may control how data is transferred through the links 136, 138, and 140. Various protocols, such as Ethernet, wireless Ethernet, and Token Ring, may operate at the data link layer 204. As part of the data link layer 204, data may be processed into packets that possess, among other features, a media access control (MAC) source and destination address.

The network layer 206 may control how data is routed through the network 100. For TCP/IP communications, the IP operates at the network layer 206. As part of the network layer 206, data may be processed into packets that possess, among of features, an IP source and destination address. In addition, the IP may generate a checksum to determine if a packet has been corrupted. If the checksum fails verification, the IP may chose to drop the packet or transmit an error message to the originating node. Routers and switches may utilize information inserted into message packets by network layer 206 programs to route packets from a source node to a destination node.

The transport layer 208 may control how packets are transported. For TCP/IP communications, the TCP operates at the transport layer 208. As part of the transport layer 208, the TCP may read sequence numbers from packets to ensure that the proper ordering of packets is maintained. When an out-of-order packet is found, the TCP protocol may request that the packet be retransmitted or close the connection. Since numerous TCP connections may operate concurrently over a single link 136-144 (FIG. 1), each TCP connection may be assigned, at a minimum, a distinct pair of TCP port numbers to identify packets belonging to a specific connection.

At the application layer 210, numerous high-level protocols, such as hypertext transfer protocol (HTTP), file transfer protocol (FTP), and simple mail transfer protocol (SMTP), may operate. The high-level protocols may facilitate the interaction between an operating system (not specifically shown), stored in the memory 110, and the TCP/IP stack 114 (FIG. 1).

In accordance with embodiments of the invention, protocol-specific processing associated with all layers 202-210 of the TCP/IP stack 114 may be moved or "offloaded" from the CPU 108 to various hardware units, such as application specific integrated circuits (ASICS) included in the NICs 118, 120, and 122. That is, while the programs and data files associated with TCP/IP stack 114 may still reside in the memory 110, the processing associated with the TCP/IP stack 114 may be offloaded to ASICs in the NICs.

Although not specially shown in FIG. 1, each NIC 118, 120, and 122 may comprise one or more ASICs that are designed to handle the operations associated with and the processing carried out by all layers 202-210 of the TCP/IP stack 114. In alternative embodiments, the NICs 118, 120, and 122 may comprise a processor, such as a stand-alone CPU or a microcontroller. In these alternative embodiments, it may be the CPU or microcontroller of the NIC to which the offloading occurs.

The offloading of the processing implementing the TCP/IP stack 114 may be performed by the NICs 118, 120, and 122 on a TCP connection-per-connection basis. For example, a request to offload a TCP connection may be generated by an operating system executing on the CPU 108 and sent to the teaming software 116. The teaming software 116 may examine the request and send the request to the appropriate NIC 118, 120, or 120 on which the connection is currently operating. Upon receiving the request, the NIC 118, 120, or 122 may offload the processing implementing the TCP/IP stack 114 to the one or more ASICs in the respective NIC 118, 120, or 122.

Referring again to FIG. 1, the teaming software 116 may team NICs 118, 120, and 122, resulting in a single virtual network interface that possess a single MAC and IP address. The network switch 124 may send data in the form of packets from the clients 104 and 106 to the server 102 via a TCP connection. Each connection may be associated with a "context" that identifies, among other information, the IP addresses and the TCP port numbers of the source and destination used for the connection, as well as the current sequence number associated with the most currently received packet in the connection. As previously mentioned, each TCP connection may selectively offload the associated protocol processing to one or more ASICs in the NIC 118, 120, or 122 that is handling the connection.

In accordance with embodiments of the invention, the teaming software 116 may adapt to network reconfigurations to ensure that the offloading of a TCP connection is properly performed. For example, while transferring packets associated with a TCP connection, the exemplary link 136 may become inoperable. The network switch 124 may detect the inoperability and use an alternate link in the team, e.g., the link 138. The teaming software 116 may detect and manage network reconfigurations so that offloaded connections established by the NICs 118, 120, and 122 may continue to operate in a teamed NIC environment.

Figure 3:
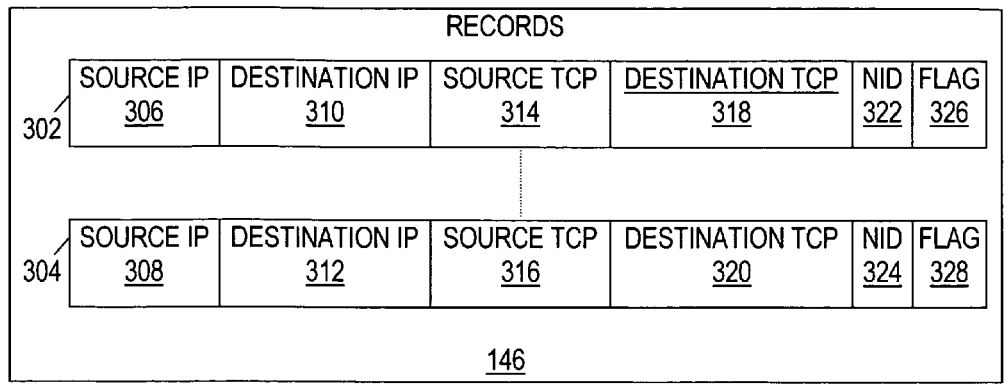
FIG. 3 illustrates the set of connection records of FIG. 1 in accordance with embodiments of the invention.

Referring now to FIGS. 1 and 3, the memory 110 (FIG. 1) stores a set of connection records 112. Each record in the set of connection records 112 may be maintained by the teaming software 116 and may represent active TCP connections established via the NICs 118, 120, and 122. The exemplary connection records 112 contain two records 302 and 304 (FIG. 3). The records 302 and 304 may comprise source IP addresses 306 and 308, destination IP addresses 310 and 312, source TCP port numbers 314 and 316, destination TCP port numbers 318 and 320, network interface identifiers (NID) 322 and 324, and offload flags 326 and 328. As previously discussed, a TCP connection may be uniquely identified by a source IP address, a destination IP address, a source TCP port number, and a destination TCP port number. These values may be referred to as a "connection identifier." The offload flag may be asserted to indicate a connection is currently offloaded. The network interface identifiers 322 and 324 may identify to the teaming software 116 which NIC 118, 120, or 140 is currently handling a connection identified by the connection identifier.

When the NICs 118, 120, and 122 are teamed together, the network switch 124 may establish transfer data through any one of the NICs 118, 120, or 122 in the team. The network switch 124 may use information stored in the packet, such as the source IP address, associated with the connection to determination which NIC 118, 120, or 122 is utilized for the connection. For example, the network switch 124 may route a TCP connection from the client 104, having a first IP address, to the server 102 via NIC 118. The network switch 124 may route a TCP connection from the client 106, having an IP different from that of the client 104, to the server 102 via NIC 120. The algorithm used by the network switch 124 to assign a particular client to a specific NIC may be unknown to the server 102.

When a NIC 118, 120, or 122 or its associated link fails, the network switch 124 may continue to transfer data associated with a TCP connection using another NIC in the team. Since the protocol processing may have been offloaded to ASICs on the failed NIC, the TCP connection may need to be reloaded onto a new NIC in the team.

Figure 4:
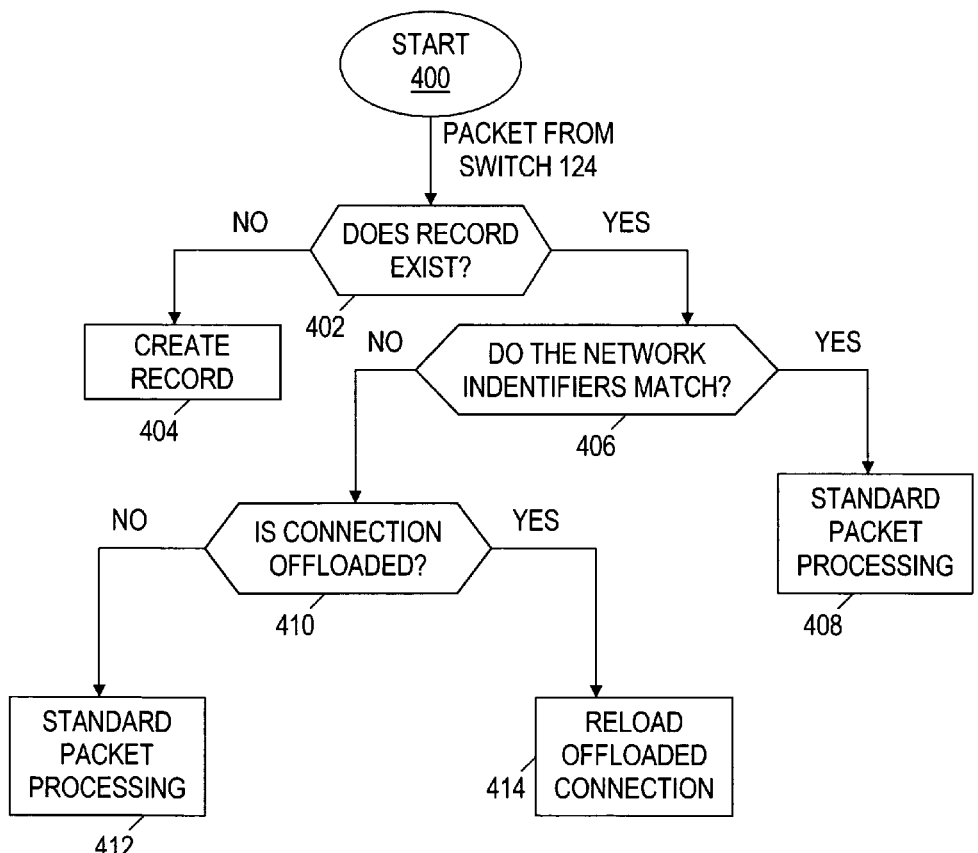
FIG. 4 illustrates a flow diagram of a packet handling procedure in accordance with embodiments of the invention.

FIG. 4 illustrates a flow diagram of an exemplary procedure performed by the teaming software 116 (FIG. 1) to reload offloaded connections in a teamed NIC environment. If a packet is not properly handled by the offload hardware in the NIC 118, 120, and 122, the teaming software 116 may examine the set of records 112 stored in the memory unit 110 to determine if a record currently exists that matches the connection identifier contained within the received packet (block 402). If no record is found, a record containing the connection identifier of the packet, a non-asserted value for the offload flag field, and an network interface identifier that identifies the NIC 118, 120, or 122 that received the packet, are optionally created and inserted into the set of records 112 by the teaming software 116 (block 404). If a record in the set of records 112 does match the connection identifier in the packet (block 402), the network identifier contained in the record may be examined by the teaming software 116 (block 406). If the network identifier contained in the matching record and the network identifier associated with the NIC 118, 120, or 122 that received the packet are equivalent, standard packet processing may occur (block 408). Standard packet processing may indicate that a network reconfiguration by the network switch 124 (FIG. 1) has not occurred. The connection, therefore, may be processed without intervention by the teaming software 116, either in an offloaded or non-offloaded capacity.

If the network identifier contained in the matching record (block 406) does not match the actual network interface identifier of the NIC 118, 120, or 122 that received the packet, due to network reconfiguration or another inconsistency such as link failure, the flag field in the record is examined by the teaming software 116 to determine if the connection is currently offloaded (block 410). If the connection is not offloaded, standard packet processing may occur and the packet may be processed by programs of the TCP/IP stack 114 (block 412). If the connection is offloaded (block 410), the network interface identifier in the matching record in the set of records 112 may be updated to indicate the network interface that received the packet. The connection may be reloaded from the former NIC 118, 120, or 122 onto the NIC 118, 120, or 122 the packet was received on (block 414). The reloading may comprise transferring the context of the connection, as previously discussed, from the former NIC 118, 120, or 122 to the NIC 118, 120, or 122 the packet was received on and reloading any associated data. For example, an offloaded connection may operate over link 136, and data associated with the connection may be received by the NIC 118 (FIG. 1). If a packet associated with the offloaded connection is subsequently received by the NIC 120, the teaming software 116 (FIG. 1) may detect the reception of the packet and attempt to reload the offloaded connection onto the NIC 120.

When the TCP/IP stack 114, or an operating system stored in the memory 110, requests that a TCP connection be offloaded, the teaming software 116 may determine if a matching record for the requested connection exists in the set of records 112. If no record exists, the teaming software 116 may arbitrarily select one of the NICs 118, 120, or 122 to offload to connection. If the teaming software 116 arbitrarily selects the incorrect NIC 118, 120, or 122, the TCP connection is reloaded onto the correct NIC 118, 120, or 122. If a record does exist in the set of records 112, the connection may be offloaded, if possible, to the network interface identified in the record, and the offload flag associated with the identified record may be set to the value "1."

When a network fault, such as a link 136, 138, or 140 failure, is reported by a NIC 118, 120, or 122, the teaming software 116 may process each connection record in the set of records 112 that identifies the network interface that has faulted. For each matching record in the set of records 112 that is not offloaded, having a non-asserted offload flag, the record is removed from the set of records 112. For each matching record in the set of records 112 that is offloaded, having an asserted offload flag, the teaming software 116 may reloaded the connection, if the fault allows, and then may delete the record. Since the network switch 124 may re-enumerate the network interfaces and start transmitting a previous connection on a new link 136, 138, or 140 when a network fault occurs, the offloaded connections may be reloaded when the first packet arrives on the network interface 118, 120, or 122 connected to the new link 136, 138, or 140.

In some embodiments, when a packet that signifies the completion of a connection, such as a TCP FIN or RST, is received by a NIC 118, 120, or 122, any records with a corresponding connection identifier in the set of records 112 may be deleted. In addition, a record aging mechanism may be employed on the set of records 112 to eliminate old and spurious records that no longer are active.

The above discussion is meant to be illustrative of the principles and various embodiments of the present invention. Numerous variations and modifications will become apparent to those skilled in the art once the above disclosure is fully appreciated. For example, the records 112 may be maintained by network software, not the teaming software 116, and provided on demand to the teaming software 116. In addition, if the records 112 are maintained for non-offloaded connections, the procedure utilized by the teaming software 116 may be modified to detect a denial of service (DoS) attack on the server 102. The teaming software may respond to the DoS by rejecting packets with a specific IP and MAC address. It is intended that the following claims be interpreted to embrace all such variations and modifications.

What is claimed is:
1. A computer system comprising:
a central processing unit (CPU); and
first and second network adapters teamed together and configured to receive offloaded connections;
wherein a program executing on the CPU reloads an offloaded connection established by the first network adapter onto the second network adapter as a result of one of a plurality of packets associated with the offloaded connection being received on the second network adaptor.

2. The system of claim 1 wherein the first and second network adapters are capable of fully offloading all protocol processing.

3. The system of claim 1 wherein the first and second network adapters transmit and receive packets of data using a single media access control (MAC) and internet protocol (IP) address.

4. The system of claim 1 wherein the program reloads an offloaded connection by transferring the context of the connection from the first network adapter to the second network adapter.

5. The system of claim 1 wherein the program monitors every packet received by the first and second network adapters and inactivates connections associated with packets that have not been received for a defined time period.

6. The system of claim 1 wherein the first and second network adapters send a notification to the program if a connection is prematurely terminated.

7. The system of claim 1 wherein the first and second network adapters comprise network interface cards (NICs).

8. A method comprising:
examining a packet received from an external device;
determining whether a connection associated with the packet is currently offloaded; and
reloading the connection in response to the packet associated with the connection being offloaded and received by a network interface not currently processing the offloaded connection.

9. The method of claim 8 further comprising determining an identifier for the network interface that receives the packet and writing the determined identifier to a memory.

10. The method of claim 8 wherein the reloading further comprises copying the context of the connection to the network interface that received the packet.

11. The method of claim 8 wherein the network interface that received the packet and the network interface currently offloading the connection are teamed together.

12. A non-transitory computer readable media storing instructions executable by a computer system, and when executed the instructions implement a method comprising:
examining a packet received from an external device;
determining whether a connection associated with the packet is currently offloaded; and
reloading the connection as a result of the packet associated with the connection being offloaded and received by a network interface not currently processing the offloaded connection.

13. The computer readable media of claim 12 further comprising determining, an identifier for the network interface that receives the packet and writing, the determined identifier to a memory unit.

14. The computer readable media of claim 12 wherein the reloading further comprises copying the context of the connection to the network interface that received the packet.

15. The computer readable media of claim 12 wherein the network interface that received the packet and the network interface currently offloading the connection are teamed together.

16. A computer system comprising:
means for reading and executing programs; and
first and second means for sending and receiving data connections over a network, the first and second means grouped together and capable of processing offloaded data connections;
wherein a program executed by the means for reading and executing programs reloads an offloaded connection established by the first means for sending and receiving data onto the second means for sending and receiving data in response to one of a plurality of packets associated with the offloaded connection being received on the second means for sending and receiving data.

17. The system of claim 16 wherein the first and second means for sending and receiving data connections are capable of fully offloading all protocol processing.

18. The system of claim 16 wherein the first and second means for sending and receiving data connections send and receive packets of data using a single media access control (MAC) and internet protocol (IP) address.

19. The system of claim 16 wherein the program reloads an offloaded connection by transferring the context of the connection from the first means for sending, and receiving, data connections to the second means for sending and receiving data connections.

20. The system of claim 16 wherein the program monitors all data received by the first and second means for sending and receiving data connections.

21. The system of claim 16 wherein the first and second means for sending and receiving data connections send a notification to the program if a connection is prematurely terminated.

* * * * *

UNITED STATES PATENT AND TRADEMARK OFFICE
CERTIFICATE OF CORRECTION

PATENT NO. : 8,493,839 B2  
APPLICATION NO. : 10/717730  
DATED : July 23, 2013  
INVENTOR(S) : Daniel N. Cripe et al.

Page 1 of 1

It is certified that error appears in the above-identified patent and that said Letters Patent is hereby corrected as shown below:

In the Claims

In column 8, line 6, in Claim 13, delete "determining," and insert -- determining --, therefor.

In column 8, line 7, in Claim 13, delete "writing," and insert -- writing --, therefor.

In column 8, line 35, in Claim 18, delete "(MAC)and" and insert -- (MAC) and --, therefor.

In column 8, line 39, in Claim 19, delete "sending, and receiving," and insert -- sending and receiving --, therefor.

Signed and Sealed this  
Twenty-sixth Day of November, 2013

Margaret A. Focarino  
*Commissioner for Patents of the United States Patent and Trademark Office*